United States Patent Office 3,351,623
Patented Nov. 7, 1967

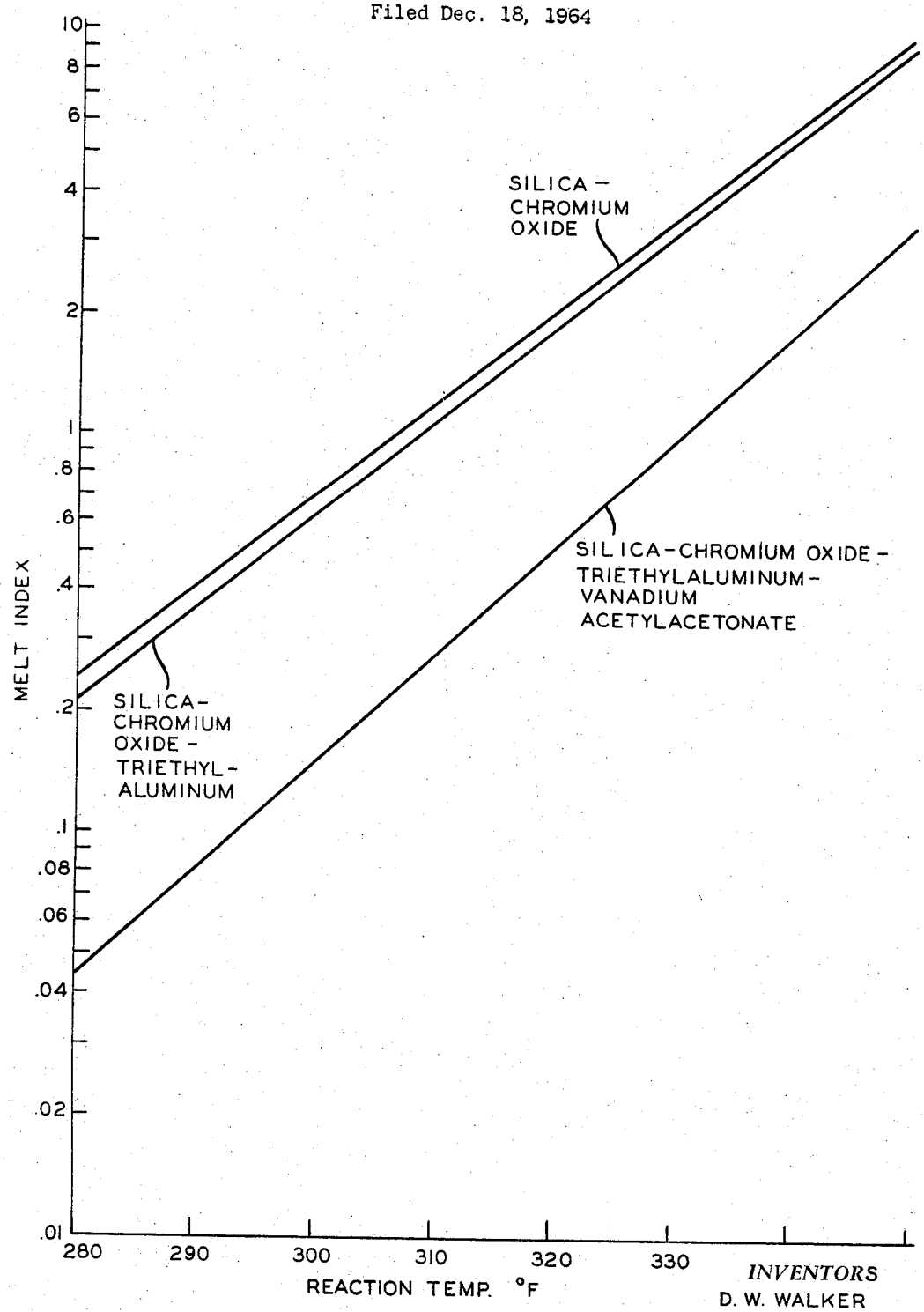

3,351,623
ETHYLENE POLYMERIZATION
Darrell W. Walker and Edward L. Czenkusch, Bartlesville, Okla., assignors to Phillips Petroleum Company, a corporation of Delaware
Filed Dec. 18, 1964, Ser. No. 419,313
13 Claims. (Cl. 260—94.9)

This invention relates to the polymerization of ethylene for the production of solid polymers. In another aspect, it relates to new catalyst systems for ethylene polymerization.

In the polymerization of ethylene, the melt index (indicative principally of the molecular weight of the polymer) is closely proportional to the reaction temperature, lower temperatures producing polymer with a low melt index (high molecular weight) and higher temperatures producing polymer with a high melt index (low molecular weight). Thus, a polymer can in general be produced having a specific melt index which is suitable for its intended application, be it for pipe, film, bottles, or the like. Operationally speaking, however, it is desirable to operate at the highest reaction temperature which will produce polymer having the required melt index. This high reaction temperature is desirable because it provides the largest temperature differential across the reactor wall, and therefore the best heat transfer, between the inner reactor wall in contact with the reaction mixture and the outer reactor wall in contact with the coolant. Olefin polymerization reactions are exothermic and heat must be carried away, but the coolant temperature must not be so low that it will cause polymer to deposit upon the inner walls of the reactor. Consequently, polymerization processes utilizing higher reaction temperatures can be cooled more effectively without danger of losing control of the process.

According to one aspect of our invention, we have found that such a reaction temperature-melt index relationship can be substantially improved when polymerizing ethylene over a supported chromium oxide catalyst system by the utilization of a vanadium beta-diketone, exemplified by vanadium acetylacetonate, and an organometal, exemplified by triethylaluminum. That such a beneficial result would be obtained from such a combination of catalytic materials was entirely unexpected. When an organometal, such as triethylaluminum, is added to the supported chromium oxide catalyst system, a mild improvement in the reaction temperature-melt index relationship is realized. However, when vanadium acetylacetonate is added to the supported chromium oxide, there is a poisoning effect and essentially no polymer of any description is formed. It is readily seen, therefore, that the substantially beneficial results obtained when both triethylaluminum and vanadium acetylacetonate were added to the supported chromium oxide system were completely surprising and unobvious. Such a combination results in a very large improvement in the temperature-melt index relationship. In some cases the invention permits an increase in operating temperature of 20° F. or more.

In accordance with a further aspect of the invention, it has been found that ethylene can be polymerized to a solid polymer by contact with a halogen-free catalyst consisting of a vanadium beta-diketone, an organometal, and silica.

An object of this invention is to provide new ethylene polymerization processes. A further object is to provide a process whereby ethylene is polymerized to relatively high molecular weight (low melt index) polymer at a relatively high reaction temperature. A further object is to provide new catalysts for ethylene polymerization. A further object is to provide new halogen-free ethylene polymerization catalysts based on combinations of a vanadium beta-diketone, an organometal and at least one metal oxide or silica.

Other objects and advantages of this invention will be apparent to those skilled in the art upon reading this disclosure which includes, as the single figure, a graph illustrating one advantage of this invention.

The graph shows the relationship between the reaction temperature and melt index (ASTM D 1238) with three different catalysts. The lower curve shows operation using the catalyst of the present invention wherein the melt index is lower for a given reaction temperature when compared to catalysts in which the vanadium beta-diketone is not used. In like manner, higher temperatures can be used to produce polymer of a given melt index when the vanadium beta-diketone is used in the catalyst system. The graph is based upon work reported in Example I and is more fully described there.

Vanadium beta-diketones when associated with an organometal are known components of many catalyst systems which have been used for the polymerization of olefins. However, these metals are invariably further associated with halide compounds. Generally halides of transition metals such as titanium chloride, for example. Alternatively, the halogen may be associated with the organometal, such as diethylaluminum chloride.

Broadly, the invention resides in a process for polymerizing ethylene which comprises contacting an ethylene containing stream under polymerization conditions with a catalyst which forms on mixing (1) an oxide component selected from the group consisting of silica; mixtures of silica and alumina containing up to 25 weight percent alumina; and mixtures of chromium oxide and at least one material selected from the group consisting of silica, alumina, zirconia, and thoria, at least part of the chromium being in the hexavalent state at the initial contacting of monomer therewith, (2) an organometal component of the formula $R_xM$ wherein R is selected from the group consisting of hydrogen and alkyl, aryl, cycloalkyl, alkoxy radicals and combinations of these radicals containing up to 12 carbon atoms, at least one R group being a hydrocarbon radical; M is selected from the group consisting of aluminum, gallium, indium, thallium, zinc, boron, lead, lithium, zirconium, cobalt, magnesium, and tin; and $x$ is an integer equal to the valence of M, and (3) a vanadium component selected from the group consisting of vanadium chelates and vanadyl chelates of beta-diketones of the formula

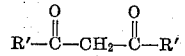

where each R' is individually selected from the group consisting of alkyl, aryl, and cycloalkyl radicals and combinations of said radicals, each R' containing up to 12 carbon atoms.

The production of ethylene polymers over suitably supported chromium oxide catalysts is well described in U.S. Patent 2,825,721, issued to John Paul Hogan and Robert L. Banks. The chromium oxide portion of the catalyst system of this invention is prepared as described in that patent. In general, this composite is prepared by depositing chromium oxide, or a chromium compound convertible to the oxide on calcination, on supports such as silica, alumina, zirconia, thoria, or combinations of these. The catalyst is activated by heating at elevated temperatures in the presence of air.

Some suitable beta-diketones are: 2,4-pentanedione (acetylacetone), 2,4-hexanedione, 2,4-heptanedione, 5-methyl-2,4-hexanedione, 2,4-octanedione, 5,5-dimethyl-2,4-hexanedione, 2,2-dimethyl-3,5-nonanedione, 1- cyclohexyl-1,3-butanedione, 1-phenyl-1,3-butanedione, 1-(4-biphenyl)-1,3-butanedione, 1-phenyl-1,3-pentanedione, 1-phenyl-5,5-dimethyl-2,4-hexanedione, 1,3 - diphenyl-1,3-propanedione, 1,4-diphenyl-1,3-butanedione, 1-phenyl-3-benzyl-1,3-pentanedione, and the like.

Depending upon the valency of the vanadium, the vanadium (and vanadyl) chelate compounds will be of the type: $V(Ac)_2$, $V(Ac)_3$, $VO(Ac)_2$, $VO(Ac)_3$, where Ac is one of the above-mentioned beta-diketones.

The organometal components of the catalyst system which are applicable for use in this invention are those which conform to the following general formula:

$$R_xM$$

wherein R is hydrogen or a hydrocarbon radical, having up to 12 carbon atoms, selected from the group consisting of alkyl, aryl, cycloalkyl, alkoxy, and combinations of these, at least one R group being a hydrocarbon radical; M is a metal selected from the group consisting of aluminum, gallium, indium, thallium, zinc, boron, lead, lithium, zirconium, cobalt, magnesium, and tin; and $x$ is an integer equal to the valence of metal M.

The preferred organometal compounds are organoaluminum compounds of the following general type:

wherein $R_1$, $R_2$, and $R_3$ may be the same or different monovalent hydrocarbon radicals. Some specific examples of suitable R groups include methyl, ethyl, isopropyl, n-amyl, n-hexyl, n-octyl, n-dodecyl, methylcyclohexyl, 2-phenylethyl, cyclopentyl, cyclohexyl, phenylcyclohexyl, and cyclohexylphenyl.

For use in the first aspect of the invention, the proportion of vanadium-containing chelate compound and of the organometal compound in relation to the chromium oxide component of the catalyst is described in terms of their molar ratio. Thus, the organometal usage will be in the range of from about 0.1 to 30, preferably 1 to 10, moles of organometal per mole of vanadium chelate (a TEA/V ratio when using triethylaluminum, for example). In turn, the amount of vanadium chelate used will be in the range of from about 0.1 to about 10, preferably from about 0.5 to about 5, moles of vanadium chelate per mole of chromium in the solid catalyst (a V/Cr ratio). The amount of the supported chromium oxide used in the polymerization reaction will depend upon a number of factors such as the type of contacting technique carried out, the conditions of polymerization, and the type of polymer desired.

For use in the second aspect of the invention, the proportion of the vanadium-containing chelate compound and of the organometal compound in relation to the silica component of the catalyst is described in terms of their molar ratios. Thus, the organometal usage will be in the range of from about 2 to 30, preferably 4 to 10, moles of organometal per mole of vanadium chelate (TEA/V ratio when using triethylaluminum, for example). In turn, the amount of vanadium chelate used will be in the range of from about 0.001 to about 10, preferably from about 0.01 to about 1, moles of vanadium chelate per mole of silica (V/Si). The rate of usage of the silica component in the polymerization reaction will depend upon a number of factors such as the type of contacting technique carried out, the conditions of polymerization, and the type of ploymer desired.

It is preferred that the vanadium chelate compound and the organometal are contacted together prior to their contact with the olefin under polymerization conditions within the reactor. It is believed that the contact of these two metal containing materials results in the formation of a reaction product which performs its useful function within the catalyst system. It is also possible, though less desirable, to meter in appropriate quantities of these two reagents into the reaction zone separately. The metal oxide can be premixed with the other components of the catalyst system but we generally prefer to add the solid metal oxide component separately.

The catalyst system and process of this invention are applicable for the preparation of polyethylene and its copolymers which comprise greater than about 75 mole percent combined ethylene. Such copolymers can be prepared from monomer mixtures which contain 3 to 8 carbon containing 1-olefins such as a propylene, 1-butene, 1-pentene, 1-hexene, 3-methyl-1-pentene, 1-octene, and the like, as well as such conjugated olefins as butadiene and isoprene. However, the invention is particularly valuable in the preparation of homopolymers of ethylene.

With the exception of the use of the vanadium chelate compound and the organometal compound, the polymerization of ethylene is carried out according to the description of the above-mentioned Hogan and Banks patent. The preferred range of polymerization temperature, utilizing the invention catalyst system is 275–335° F. with the greatest beneficial effects seen at 300–320° F.

The following examples illustrate specific embodiments of the invention. They should not be considered unduly limiting.

*Example 1*

Ethylene was polymerized in a series of 1 hour tests carried out in a stainless steel reactor of about 1-liter capacity. The reactor was charged with the catalyst components, the cyclohexane diluent, and then with a continuous supply of ethylene sufficient to maintain the desired pressure during the reaction period. The solid catalyst used as a microspheroidal silica which was impregnated with 0.7 weight percent chromium (calculated as the metal though present as the oxide). The composite was activated for 16 hours in air at 1200° F. The vanadium acetylacetonate $V(Ac)_3$, and triethylaluminum TEA, were the catalytic adjuvants. These latter were premixed before being introduced into the reactor which already contained the diluent. The polymerization was carried out at a pressure of 450 p.s.i.g.

The results of these runs are shown in the following table:

| Run No. | Temp., | Silica-chromium oxide, g. | $V(Ac)_3$, mg. | TEA, mg. | V/Cr | TEA/V | Rate, g./g.-hr.[1] | ASTM D 1238 Melt Index |
|---|---|---|---|---|---|---|---|---|
| 1 | 300 | 0.0990 | 3.51 | 2.85 | 0.8 | 2.5 | 650 | 0.15 |
| 2 | 300 | 0.0275 |  | 1.01 | 0 | 0 | 2,310 | 0.60 |
| 3 | 300 | 0.0466 |  |  | 0 | 0 | 1,000 | 0.69 |
| 4 | 308 | 0.0618 | 3.08 | 3.72 | 1 | 4 | 1,120 | 0.26 |
| 5 | 308 | 0.0284 |  | 1.78 | 0 | 0 | 2,660 | 0.97 |
| 6 | 318 | 0.0650 | 3.16 |  | 1 | 0 | 0 |  |
| 7 | 318 | 0.1000 | 4.91 | 3.1 | 1 | 2 | 482 | 0.42 |
| 8 | 318 | 0.0671 | 3.16 | 4.15 | 1 | 4 | 1,010 | 0.45 |
| 9 | 318 | 0.0271 |  | 1.67 | 0 | 0 | 3,200 | 1.53 |
| 10 | 318 | 0.0992 | 14.0 | 13.7 | 3 | 3 | 240 | 0.092 |

[1] G. polymer/g. silica-chromium oxide/hr.

The data in the table above show that the use of vanadium acetylacetonate and triethylaluminum in conjunction with a chromium oxide catalyst results in the production of polymers having a desirably low melt index for a given operating temperature. This is seen in Runs 1, 4, 7, 8, and 10. Runs 2 and 3 show that the use of triethylaluminum without the vanadium chelate has relatively little effect on the melt index. Run 6 shows that the use of the vanadium compound without the organometal causes no polymer to be formed at all.

The curves on the figure accompanying this application are based on data in the table in this example. Runs 1, 4, and 8 provide the points for the silica-chromium oxide-triethylaluminum-vanadium acetylacetonate curve, the catalyst of the invention. Run 3, and previous work to establish the slope, is the basis for silica-chromium oxide catalyst curve and, in like manner, Runs 2 and 5 provide the curve for the silica-chromium oxide-triethylaluminum. From these curves, one can see an important advantage of the invention. For a given reaction temperature, it is possible to produce a polymer of much lower melt index. Similarly, to produce a given melt index polymer, it is possible to use a much higher reaction temperature.

*Example II*

Ethylene was polymerized in a one hour test carried out in a stainless steel reactor of about 1-liter capacity. A 0.0941 g. quantity of silica gel (Davison microspheroidal silica having a particle size of about 80 microns, a surface area of about 650 m.²/g., and a pore diameter of about 60 angstroms) was charged into the reactor which was heated to 325° F. and which had been purged with nitrogen. Prior to its introduction into the reactor, the silica gel was activated at 1200° F. in air for 16 hours. A cyclohexane solution containing 13.3 mg. vanadium acetylacetonate and 17.3 mg. triethylaluminum was injected into the reactor. The TEA/V molar ratio was 4 and the V/Si molar ratio was 0.024. A 0.5 pound quantity of cyclohexane diluent was charged, ethylene was added to maintain a pressure of 450 p.s.i.g., and the reaction was allowed to proceed for one hour. At the end of that time 6.5 g. of solid polymer (inherent viscosity of 8.87) was recovered, indicating a production rate of 69 g./g.-hr. based on the weight of the silica added.

When 0.42 mg. of vanadium as vanadium acetylacetonate and 2.72 mg. triethylaluminum (TEA/V molar ratio of 4.0) were used without the silica present in a run at 208° F., no solid polymer was produced.

As many possible embodiments can be made of this invention without departing from the scope thereof, it is to be understood that all matter herein set forth is to be interpreted as illustrative and not as unduly limiting the invention.

We claim:

1. A process for polymerizing ethylene which comprises contacting an ethylene containing stream under polymerization conditions with a catalyst which forms on mixing (1) an oxide component selected from the group consisting of silica; mixtures of silica and alumina containing up to 25 weight percent alumina; and mixtures of chromium oxide and at least one material selected from the group consisting of silica, alumina, zirconia, and thoria, at least part of the chromium being in the hexavalent state at the initial contacting of monomer therewith, (2) an organometal component of the formula $R_xM$ wherein R is selected from the group consisting of hydrogen and alkyl, aryl, cycloalkyl, alkoxy radicals and combinations of these radicals containing up to 12 carbon atoms, at least one R group being a hydrocarbon radical; M is selected from the group consisting of aluminum, gallium, indium, thallium, zinc, boron, lead, lithium, zirconium, cobalt, magnesium and tin; and $x$ is an integer equal to the valence of M, and (3) a vanadium component selected from the group consisting of vanadium chelates and vanadyl chelates of beta-diketones of the formula $$R'-\overset{O}{\overset{\|}{C}}-CH_2-\overset{O}{\overset{\|}{C}}-R'$$

where each R' is individually selected from the group consisting of alkyl, aryl, and cycloalkyl radicals and combinations of said radicals, each R' containing up to 12 carbon atoms.

2. The process of claim 1 wherein said ethylene containing stream consists essentially of ethylene.

3. The process of claim 1 wherein said ethylene containing stream contains a mixture of ethylene and at least one comonomer selected from the group consisting of 1-olefins and conjugated dienes containing 3 to 8 carbon atoms.

4. The process of claim 1 wherein said polymerization is carried out at 275 to 335° F.

5. The process of claim 1 wherein the oxide component is a mixture of chromium oxide and at least one material selected from the group consisting of silica, alumina, zirconia, and thoria, and wherein the mole ratio of vanadium compound to chromium is 0.1 to 10 and the mole ratio of organometal compound to vanadium compound is 0.1 to 30.

6. The process of claim 1 wherein the oxide component is silica and wherein the mole ratio of vanadium compound to silica is 0.001 to 10 and the mole ratio of organometal compound to vanadium compound is 2 to 30.

7. A process for polymerizing ethylene which comprises contacting ethylene with a catalyst which forms on mixing (1) chromium oxide associated with at least one oxide selected from the group consisting of silica, alumina, zirconia, and thoria, at least a portion of the chromium being in the hexavalent state at the initial contacting of monomer therewith, (2) vanadium acetylacetonate, and (3) triethylaluminum.

8. A process for polymerizing ethylene which comprises contacting ethylene with a catalyst which forms on mixing (1) silica, (2) vanadium acetylacetonate, and (3) triethylaluminum.

9. A catalyst which forms on mixing (1) an oxide component selected from the group consisting of silica; mixtures of silica and alumina containing up to 25 weight percent alumina; and mixtures of chromium oxide and at least one material selected from the group consisting of silica, alumina, zirconia, and thoria, at least part of the chromium being in the hexavalent state at the initial contacting of monomer therewith, (2) an organometal component of the formula $R_xM$ wherein R is selected from the group consisting of hydrogen and alkyl, aryl, cycloalkyl, alkoxy radicals and combinations of these radicals containing up to 12 carbon atoms, at least one R group being a hydrocarbon radical; M is selected from the group consisting of aluminum, gallium, indium, thallium, zinc, boron, lead, lithium, zirconium, cobalt, magnesium, and tin; and $x$ is an integer equal to the valence of M, and (3) a vanadium component selected from the group consisting of vanadium chelates and vanadyl chelates of beta-diketones of the formula $$R'-\overset{O}{\overset{\|}{C}}-CH_2-\overset{O}{\overset{\|}{C}}-R'$$

where each R' is individually selected from the group consisting of alkyl, aryl, and cycloalkyl radicals and combinations of said radicals, each R' containing up to 12 carbon atoms.

10. The catalyst of claim 9 wherein the oxide component is a mixture of chromium oxide and at least one material selected from the group consisting of silica, alumina, zirconia, and thoria, and wherein the mole ratio of vanadium compound to chromium is 0.1 to 10 and the mole ratio of organometal compound to vanadium compound is 0.1 to 30.

11. The catalyst of claim 9 wherein the metal component is silica and wherein the mole ratio of vanadium compound to silica is 0.001 to 10 and the mole ratio of organometal compound to vanadium compound is 2 to 30.

12. A catalyst which forms on mixing (1) chromium oxide associated with at least one oxide selected from the group consisting of silica, alumina, zirconia, and thoria, at least a portion of the chromium being in the hexavalent state at the initial contacting of monomer therewith, (2) vanadium acetylacetonate, and (3) triethylaluminum.

13. A catalyst which forms on mixing (1) silica, (2) vanadium acetylacetonate, and (3) triethylaluminum.

References Cited

UNITED STATES PATENTS

| | | | |
|---|---|---|---|
| 2,825,721 | 3/1958 | Hogan | 260—94.9 |
| 3,058,963 | 10/1962 | Vandenberg | 260—94.9 |

FOREIGN PATENTS 799,392   8/1958   Great Britain.

JOSEPH L. SCHOFER, *Primary Examiner.*

F. DENSON, *Assistant Examiner.*